(12) United States Patent
Danhof et al.

(10) Patent No.: US 11,938,669 B2
(45) Date of Patent: Mar. 26, 2024

(54) CONTAINER AND METHOD

(71) Applicant: Ring Container Technologies, LLC, Oakland, TN (US)

(72) Inventors: Matthew James Danhof, Knoxville, TN (US); Scott James Glassbrook, Howell, MI (US)

(73) Assignee: Ring Container Technologies, LLC, Oakland, TN (US)

( * ) Notice: Subject to any disclaimer, the term of this patent is extended or adjusted under 35 U.S.C. 154(b) by 0 days.

(21) Appl. No.: 17/527,548

(22) Filed: Nov. 16, 2021

(65) Prior Publication Data
US 2023/0150184 A1 May 18, 2023

(51) Int. Cl.
| | |
|---|---|
| *B29C 49/42* | (2006.01) |
| *B29C 49/06* | (2006.01) |
| *B29K 67/00* | (2006.01) |
| *B29L 31/00* | (2006.01) |
| *B65D 1/02* | (2006.01) |
| *B65D 41/34* | (2006.01) |

(52) U.S. Cl.
CPC ......... *B29C 49/4273* (2013.01); *B29C 49/06* (2013.01); *B65D 1/0207* (2013.01); *B65D 1/0246* (2013.01); *B65D 1/0276* (2013.01); *B65D 41/34* (2013.01); *B29K 2067/003* (2013.01); *B29L 2031/716* (2013.01); *B65D 2501/0036* (2013.01)

(58) Field of Classification Search
CPC ............ B65D 51/1168; B65D 51/1672; B65D 2205/00; B65D 2205/02; B65D 88/34; B65D 81/245; B65D 1/0207; B65D 1/0246; B65D 41/34

USPC ..... 215/311, 307, 314, 44; 220/580, 495.04, 220/785, 366.1
See application file for complete search history.

(56) References Cited

U.S. PATENT DOCUMENTS

| | | | | |
|---|---|---|---|---|
| 3,181,719 | A | * 5/1965 | Schaich | B65D 41/17 215/352 |
| 3,181,720 | A | * 5/1965 | Cassie | B65D 41/045 220/366.1 |
| 4,230,232 | A | * 10/1980 | Atkins | B65D 41/04 215/330 |
| 4,382,521 | A | 5/1983 | Ostrowsky | |
| 4,427,126 | A | 1/1984 | Ostrowsky | |
| 4,738,370 | A | 4/1988 | Urmston et al. | |
| 4,747,502 | A | * 5/1988 | Luenser | B65D 41/045 220/366.1 |
| 5,197,620 | A | 3/1993 | Gregory | |
| 5,258,191 | A | * 11/1993 | Hayes | B65D 41/3428 426/107 |
| 6,123,212 | A | * 9/2000 | Russell | B65D 41/3423 215/44 |
| 6,202,871 | B1 | * 3/2001 | Kelly | B65D 41/3423 215/350 |

(Continued)

*Primary Examiner* — Steven A. Reynolds
*Assistant Examiner* — Prince Pal
(74) *Attorney, Agent, or Firm* — Sorell, Lenna & Schmidt, LLP

(57) ABSTRACT

A blow molded container is provided. The container includes a neck having a neck finish and a transverse rim that defines an opening. A closure is provided that is engageable with the neck such that the rim is movable relative to the neck to define one or more vents configured for passage of a gas. In some embodiments, methods of use and manufacturing containers are disclosed.

20 Claims, 19 Drawing Sheets

(56) References Cited

U.S. PATENT DOCUMENTS

| | | | | |
|---|---|---|---|---|
| 6,227,391 B1* | 5/2001 | King | ............... | B65D 41/0471 |
| | | | | 215/307 |
| 6,299,006 B1* | 10/2001 | Samonek | ............ | B65D 51/248 |
| | | | | 215/310 |
| 8,091,724 B2* | 1/2012 | King | ............... | B65D 1/0246 |
| | | | | 215/331 |
| 8,322,553 B2* | 12/2012 | Rider, Jr. | ............ | B65D 43/021 |
| | | | | 220/366.1 |
| 8,453,866 B2 | 6/2013 | Kamath | | |
| 8,474,634 B1* | 7/2013 | Branson | ............... | B65D 50/041 |
| | | | | 215/230 |
| 8,807,360 B2* | 8/2014 | Erspamer | ............ | B65D 41/3428 |
| | | | | 220/276 |
| 9,233,772 B2* | 1/2016 | Kuzma | ............... | B65D 1/0246 |
| RE47,156 E | 12/2018 | Erspamer et al. | | |
| 2010/0051572 A1* | 3/2010 | Beecroft | ............ | B65D 50/048 |
| | | | | 215/216 |
| 2011/0168708 A1* | 7/2011 | Antal, Sr. | ............ | B65D 51/1666 |
| | | | | 220/254.7 |
| 2014/0263321 A1* | 9/2014 | Chisholm | ............ | B65D 51/145 |
| | | | | 220/240 |
| 2015/0321789 A1* | 11/2015 | McGirr | ............... | B65D 7/04 |
| | | | | 220/359.1 |
| 2016/0137331 A1* | 5/2016 | Hanan | ............... | B65D 11/04 |
| | | | | 215/44 |
| 2016/0229578 A1* | 8/2016 | Hanan | ............... | B65D 41/0414 |
| 2017/0096274 A1 | 4/2017 | Albrecht et al. | | |
| 2017/0197764 A1* | 7/2017 | Hein | ............... | B65D 51/1688 |
| 2018/0134460 A1* | 5/2018 | Ramsey | ............ | B65D 41/0428 |
| 2020/0307888 A1 | 10/2020 | Dygert et al. | | |
| 2022/0081170 A1* | 3/2022 | Fraser | ............... | B29D 99/0096 |

* cited by examiner

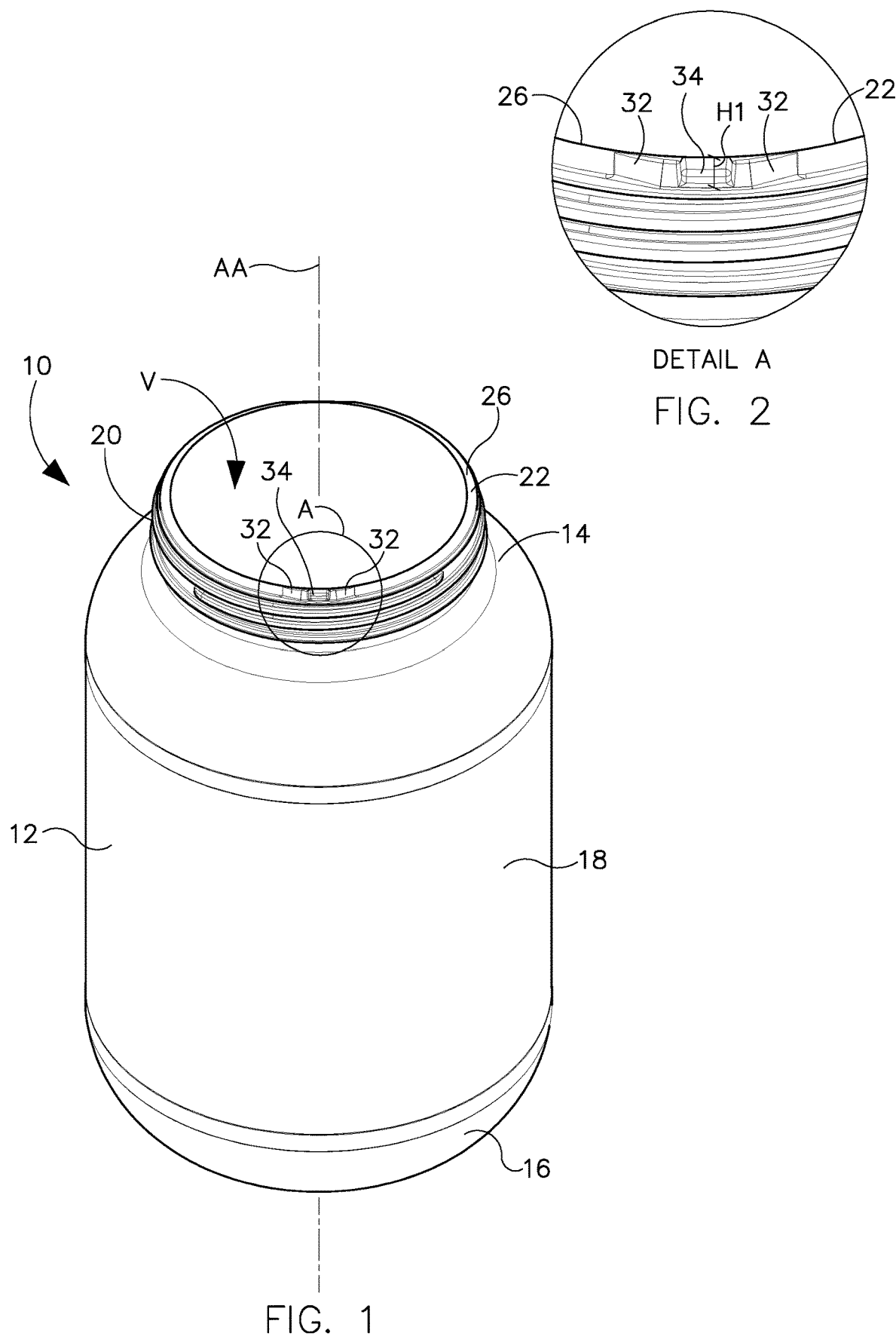

DETAIL B

DETAIL C

CONTAINER AND METHOD

TECHNICAL FIELD

The present disclosure generally relates to blow-molded containers and more particularly to plastic containers capable of high fill temperatures and pasteurization, and methods for making the same for food packaging.

BACKGROUND

Plastic blow-molded containers are commonly used for food packaging products. Many food and beverage products are sold to the consuming public in blow-molded containers. These containers can be made from polyethylene terephthalate or other suitable plastic resins in a range of sizes. The empty blow-molded containers can be filled with food and/or beverage products at a fill site utilizing automated fill equipment.

For example, manufacture of such plastic blow-molded containers can include initially forming plastic resin into a preform, which may be provided by injection molding. Typically, the preform includes a mouth and a generally tubular body that terminates in a closed end. Prior to being formed into containers, preforms are softened and transferred into a mold cavity configured in the shape of a selected container. In the mold cavity, the preforms are blow-molded or stretch blow-molded and expanded into the selected container.

These food packaging containers are adapted to store food packaging products, however, during manufacturing and depending on the type of food being stored in the container, the container may need to be vented. For example, a container can be vented as a safety feature so that gas from an inside of the container is released into the atmosphere prior to a lid being removed from the container. A container can also be vented to facilitate the escape of steam from the inside of the container and into the atmosphere when the container is filled with a hot product during manufacture. This disclosure describes an improvement over these prior technologies.

SUMMARY

In one embodiment, a blow molded container is provided. The blow molded container includes a neck having a neck finish and a transverse rim that defines an opening. A closure is provided that is engageable with the neck such that the rim is movable relative to the neck to define one or more vents configured for passage of a gas. In some embodiments, container systems and methods of use and manufacturing containers are disclosed.

In one embodiment, the blow molded container includes a neck having a neck finish and a transverse rim that defines an opening. The transverse rim includes a pair of external projections defining a relief therebetween. A body defines a longitudinal axis, and a closure is engageable with the pair of external projections such that the rim is movable relative to the neck between a first configuration and a second configuration to define one or more vents configured for passage of a gas.

In one embodiment, the blow molded container includes a neck having a neck finish. A transverse rim is provided that defines an opening. The transverse rim includes at least one projection. A closure is engageable with the at least one projection such that the rim is movable relative to the neck between a first configuration and a second configuration to define one or more vents configured for passage of a gas.

BRIEF DESCRIPTION OF THE DRAWINGS

The present disclosure will become more readily apparent from the specific description accompanied by the following drawings, in which:

FIG. 1 is a perspective view of one embodiment of components of a container in accordance with the principles of the present disclosure;

FIG. 2 is an enlarged view of detail A shown in FIG. 1;

DETAILED DESCRIPTION

Figure 4:
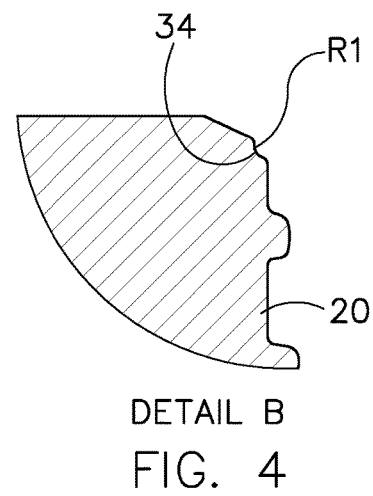
FIG. 4 is an enlarged view of detail B shown in FIG. 3.

The exemplary embodiments of blow-molded containers and more particularly, polyethylene terephthalate (PET) containers and methods for making the same are discussed in terms of food packaging products. In some embodiments, the present container includes a blown-neck finish closure with a sealing surface compression vent for products that require a breathable container.

In some embodiments, the present container includes a recess, including a sealing surface vent configured to facilitate gas release from within a sealed container. In some embodiments, the sealing surface vent is formed from a change in shape in the sealing surface when a closure, for example, a lid engages the sealing surface and torque is applied to the lid. In some embodiments, torque applied to the lid deforms selected portions of the sealing surface to form a vent in the sealing surface.

In some embodiments, the present container includes a vented container including a sealing surface that includes a vent molded into the sealing surface. In some embodiments, the present container is manufactured via a single mold to avoid additional processing of a vent on a two-stage blown finish container during manufacture. In some embodiments, the vent includes a gas relief vent formed when a closure, for example, a lid is tightened onto the neck of the container. In some embodiments, the vent can be manufactured in conjunction with two stage blown threads without additional processing of the container to form the vented closure.

In some embodiments, the present container includes a finished container. In some embodiments, the sealing surface of the container is deformed to facilitate venting of air/gasses via engagement of the sealing surface with a lid that is tightened onto the neck of the container. In some embodiments, venting of air/gases is provided via movement, for example, flexation that occurs in the sealing surface when the lid is tightened and engages the sealing surface. In some embodiments, the manufacture of the container with sealing surface vents includes minimal processing changes to existing blown thread containers that do not include vents.

In some embodiments, the present container includes a sealing surface that defines one or more compression vents. In some embodiments, the sealing surfaces moves when a lid is tightened onto the neck of the container to form one or more vents in the sealing surface. In some embodiments, the sealing surface of the container is elongated. In some embodiments, the sealing surface is angled and is configured to move in a direction relative to a bottom of the container when the lid is tightened onto the container. In some embodiments, the movement of the sealing surface reduces the diameter of the sealing surface, leaving excess sealing surface material and enabling portions of the sealing surface to move downward and away from the lid. In some embodiments, the angle of the sealing surface relative to the container is from 1 to about 65 degrees.

In some embodiments, the present container includes a sealing surface that defines a recess, for example, a relief. In some embodiments, the relief is disposed at an interface between an outermost diameter of a thread portion of the container and the sealing surface. In some embodiments, the relief includes a radius in a range of 0.1 to 1.5 millimeters (mm). In some embodiments, the sealing surface includes one or more projections, for example, one or more buttons. In some embodiments, the one or more projections each include a height that is greater than a height of the sealing surface. In some embodiments, a lid is configured to initially contact the one or more projections before the lid contacts the sealing surface. In some embodiments, the one or more projections are configured to push the sealing surface in a direction relative to a bottom of the container at or near the one or more projections to facilitate formation of one or more vents at the location where the one or more projections are disposed.

In some embodiments, the present container includes a sealing surface that defines one or more projections, for example, one or more buttons and one or more recesses, for example, one or more reliefs. In some embodiments, the one or more projections and/or one or more recesses are configured in various shapes. In some embodiments, the one or more projections and/or the one or more recesses are configured to facilitate movement at selected locations about a perimeter of the sealing surface. In some embodiments, the one or more recesses are disposed adjacent to the one or more projections.

In some embodiments, the present container includes a sealing surface that defines one or more buttons and/or one or more reliefs. In some embodiments, the container is formed via a mold. In some embodiments, the one or more buttons and/or the one or more reliefs are oriented on the sealing surface such that they do not interfere with mold release during manufacture. In some embodiments, placement of the one or more buttons and/or the one or more reliefs is dependent on an amount of venting desired for an intended use of the container and/or mold design constraints to ensure that the resulting container is reliably produced. In some embodiments, the one or more buttons and/or the one or more reliefs can be implemented on any container with a blown neck finish.

In some embodiments, the present container includes a sealing surface having an increased sealing surface width and/or angle. In some embodiments, a flex relief is disposed at the intersection of the outer-most diameter of a thread portion of the bottle and sealing surface. In some embodiments, the sealing surface includes one or more buttons to ensure movement of the sealing surface and vent location. In some embodiments, one or more reliefs are disposed adjacent to a button to increase vent effectiveness.

In some embodiments, the present container includes a sealing surface vent and/or a dome relief. In some embodiments, the sealing surface vent and/or the dome relief includes variously configured shapes and/or sizes. In some embodiments, the sealing surface includes a selected angle and/or width. In some embodiments, the angle and/or width of the sealing surface can vary depending on the appropriate angle and/or width for a particular application. In some embodiments, the container includes one or more buttons having variously configured shapes and/or sizes to provide movement of the sealing surface where desired. In some embodiments, one or more reliefs are adjacent to a vent and can be disposed at various locations on the sealing surface. In some embodiments, the sealing surface includes an even, uninterrupted and/or continuous surface configuration, for example, which does not include buttons and/or reliefs.

In some embodiments, the present container includes a sealing surface that defines a compression vent. In some embodiments, the compression vent is formed via a vent portion, for example, one or more reliefs defined from the sealing surface. In some embodiments, the compression vent is formed when a lid is tightened onto a neck of the container and tension is placed on the vent portion. In some embodiments, mechanical pressure applied to the cap moves in a downward direction onto an opening of the container defined by the sealing surface and a diameter of the opening is reduced. In some embodiments, the compression vent is a relief that is formed into the container mold. In some embodiments, the mechanical pressure creates compression that forces the one or more reliefs in a downward direction, thereby forming a compression vent in the sealing surface.

In some embodiments, a method for manufacturing the present container is provided. In some embodiments, the method includes the step of forming the container via a mold and/or an insert. In some embodiments, the mold and/or insert are machined to include the one or more buttons and/or the one or more reliefs of the present container described above. In some embodiments, the method includes the step of forming the one or more vents via engagement with a lid at a selected torque.

In some embodiments, the present manufacturing method fabricates the present container via an injection molded preform, which is subjected to a blow mold and trim process. In some embodiments, the present container can be filled with food, food preparation oils, viscous and/or beverage products. In some embodiments, the container is used for storing food including pretzels and/or cheeseballs. In some embodiments, the present container can be employed as a cold fill container. In some embodiments, the present container is employed as a light weight, high strength and barrier food packaging product.

In some embodiments, the present disclosure includes a container that is employed with a method for manufacturing food packaging having the ability to produce food packages made from PET with minimal weight and selectively desirable physical performance features, as described herein.

In some embodiments, the present container is manufactured with selective physical performance features, for example, a reduction in plastic weight, a selected pre-form design, selected bottle processing and/or bottle crystallinity of a circumferential side wall of a blown container of the present container. In some embodiments, the selected physical performance features can include a higher injection molding efficiency and/or cavitation and an increased bi-axial orientation of PET container material. In some embodiments, the present container is manufactured with a smaller diameter preform, which forms a final bottle neck finish through the blowing process that allows for higher injection mold efficiency as well as improved material orientation throughout the container. In some embodiments, the container includes a container with an improved material distribution and crystalline orientation. In some embodiments, the manufacturing method provides a container having improved top load and/or permeability. In some embodiments, the manufacturing method provides stretching PET to optimum crystalline orientation levels to improve physical performance in top load, vacuum, gas and vapor permeation through the container side wall.

The present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. In some embodiments, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of components of a blow molded container. Alternate embodiments are also disclosed. Reference is made in detail to the exemplary embodiments of the present disclosure, which are illustrated in the accompanying figures. Turning to FIGS. 1-20, there are illustrated components of a blow molded container 10.

Container 10 is configured for storing products such as food, food preparation products and/or beverages. Container 10 includes a body 12 that extends from an end 14 to an end 16, and defines a longitudinal axis AA, as shown in FIG. 1. Body 12 includes a circumferential side wall 18 that extends between ends 14, 16. A volume V is defined from body 12, as shown in FIG. 1. Body 12 includes a substantially cylindrical configuration. In some embodiments, body 12 may include various configurations, for example, oval, oblong triangular, square, polygonal, irregular, uniform, non-uniform, offset, staggered, and/or tapered. Body 12 may be manufactured by blow molding techniques, as described herein. In some embodiments, body 12 includes one or a plurality of walls.

Figure 3:
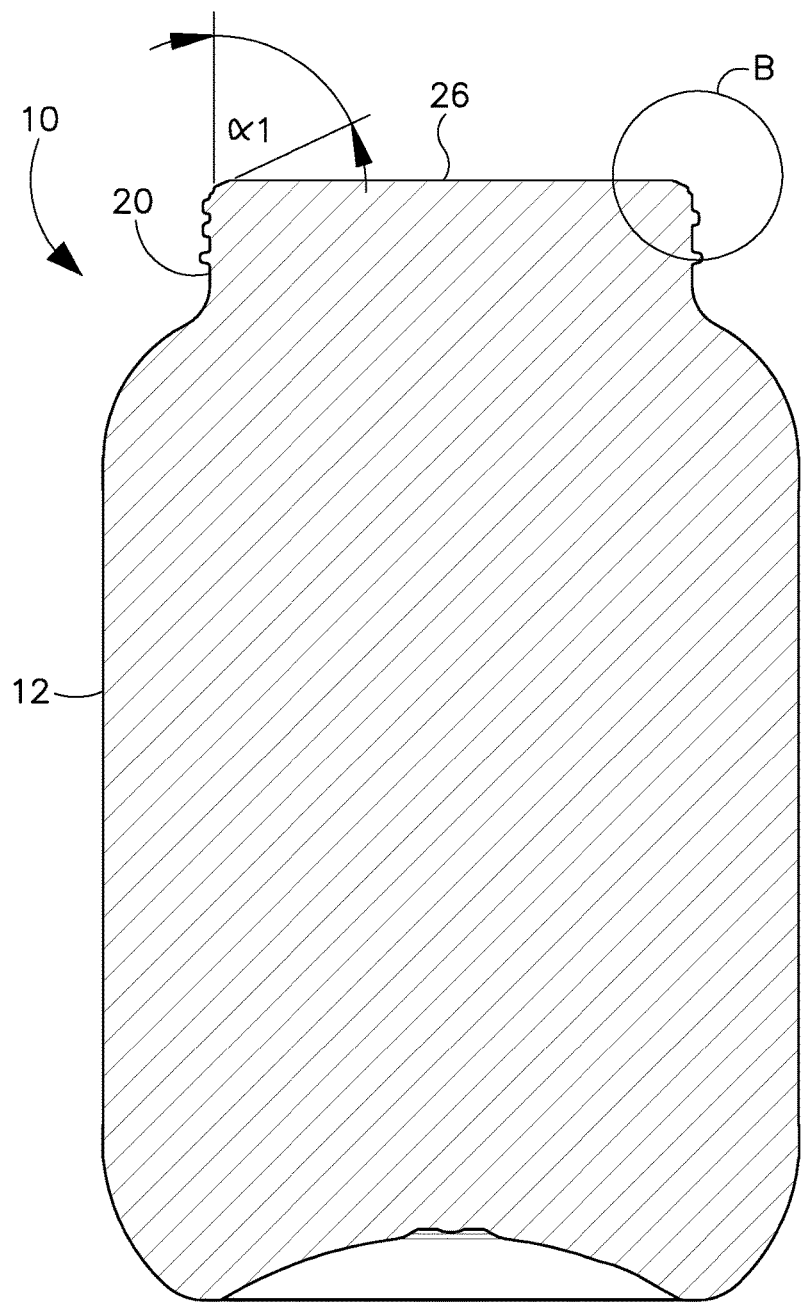
FIG. 3 is a cross-section view of components of the container shown in FIG. 1.

End 14 includes a surface that defines a neck 20, as shown in FIGS. 1 and 3. Neck 20 is centrally disposed relative to body 12 and includes a cylindrical neck configuration. In some embodiments, neck 20 may include various configurations, for example, oval, oblong triangular, square, polygonal, irregular, uniform, non-uniform, offset, staggered, and/or tapered. In some embodiments, neck 20 can include various surface configurations including smooth, rough, textured, porous, semi-porous, dimpled, knurled, toothed, raised, grooved and/or polished.

Figure 5:
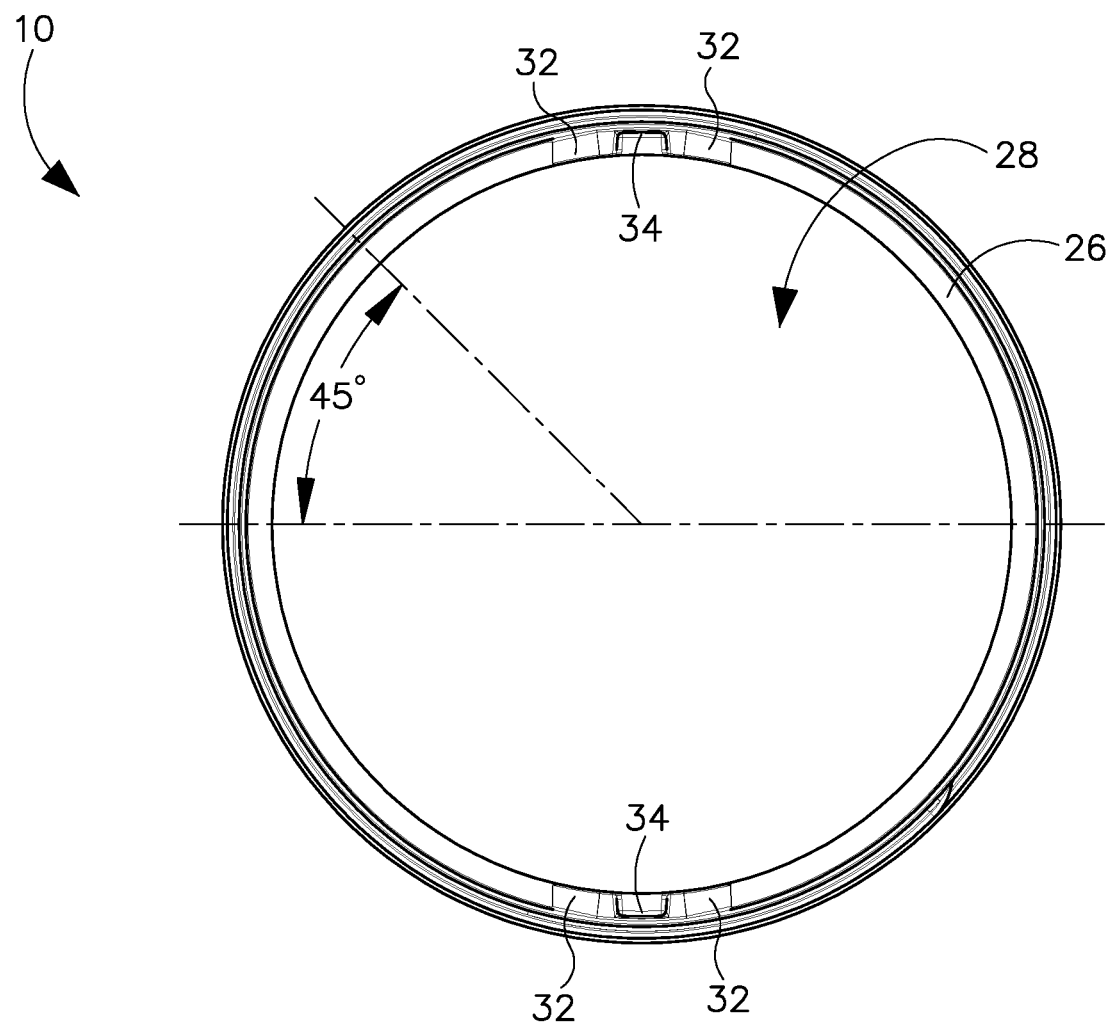
FIG. 5 is a top view of the container shown in FIG. 1.
Figure 6:
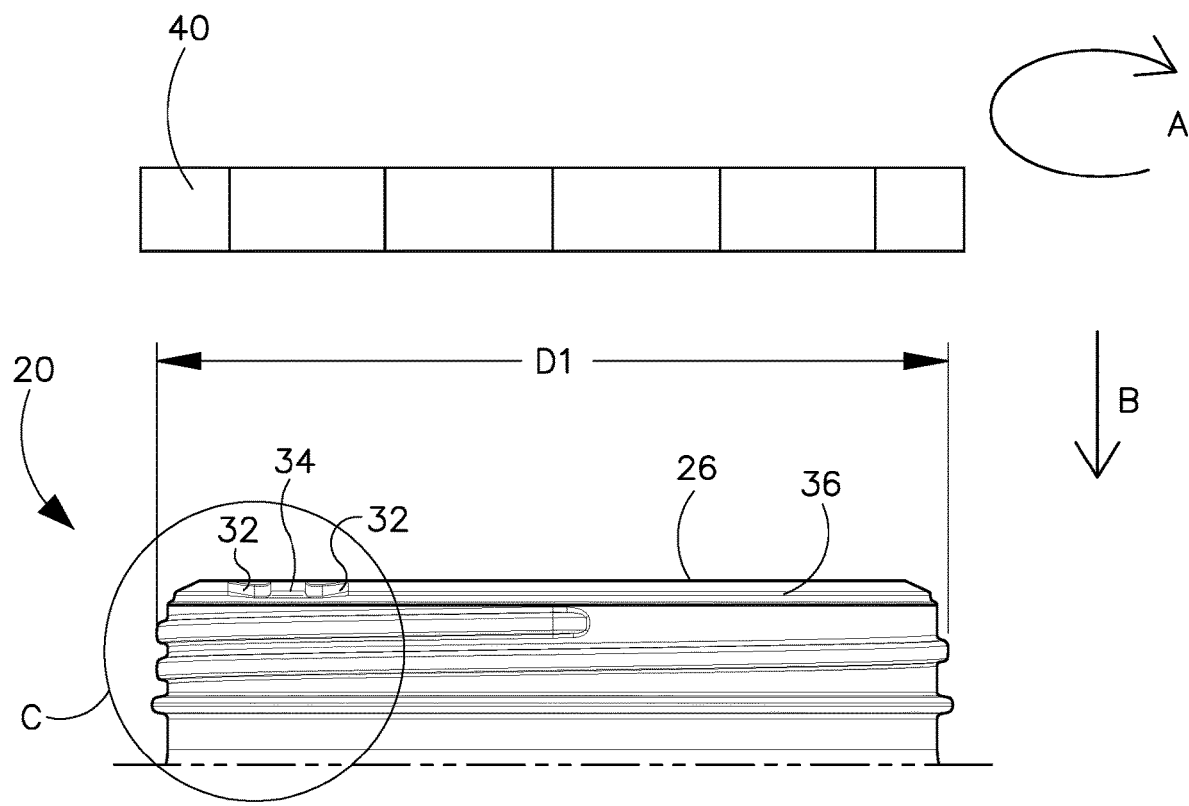
FIG. 6 is a break away side view of the container shown in FIG. 1.
Figure 7:
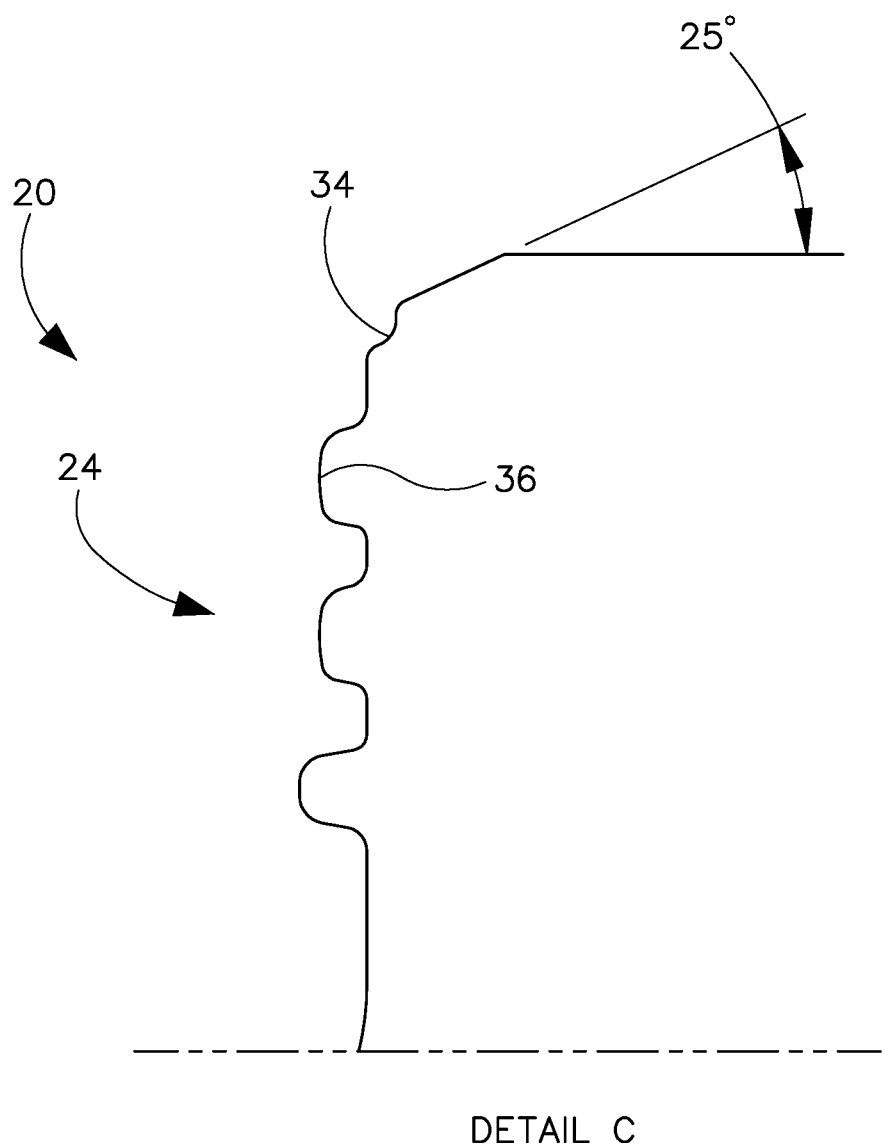
FIG. 7 is an enlarged view of detail C shown in FIG. 6.

Neck 20 includes a sealing surface 22 and a neck finish 24, as shown in FIGS. 1 and 7. Sealing surface 22 includes a circumferential rim 26 that defines an opening 28 of neck 20, as shown in FIG. 5. Rim 26 is transverse relative to longitudinal axis AA of body 12 by +/−45 degrees, as shown in FIG. 1. Rim 26 is configured for engagement with a closure, for example, a lid 40, as shown in FIG. 6, such that rim 26 is movable between a first configuration, including a non-deformed orientation and a second configuration, including a deformed orientation, relative to neck 20 to define a vent 30 for passage of gas, as described herein. In some embodiments, rim 26 can include various surface configurations including smooth, rough, textured, porous, semi-porous, dimpled, knurled, toothed, raised, continuous, grooved and/or polished.

A surface of rim 26 defines an external projection, for example, a button 32, as shown in FIGS. 1, 2 and 5. Button 32 is molded into rim 26. Button 32 is configured for engagement with lid 40 to move rim 26 from the first configuration to the second configuration that defines vent 30. In some embodiments, button 32 can include various surface configurations including smooth, rough, textured, porous, semi-porous, dimpled, knurled, toothed, raised, grooved and/or polished. In some embodiments, button 32 may include various configurations, for example, round, oval, hexagonal, pentagonal, octagonal, star, oblong triangular, square, rectangular, half moon, polygonal, irregular, uniform, non-uniform, offset, staggered, and/or tapered. In some embodiments, rim 26 includes a plurality of buttons 32. In some embodiments, buttons 32 are spaced apart along rim 26. In some embodiments, rim 26 is continuous and does not include button 32.

As shown in FIGS. 1 and 2, rim 26 includes a pair of buttons 32. Buttons 32 are tapered. Buttons 32 define a recess, for example, a relief 34 disposed therebetween. Relief 34 is molded into rim 26. Relief 34 is defined from a surface of container 10 disposed at an interface between an outermost diameter D1 of a thread 36 and a surface of rim 26, as shown in FIG. 6. Relief 34 includes a radius R1, as shown in FIG. 4. In some embodiments, radius R1 is in a range of 0.1 to 1.5 mm. In some embodiments, relief 34 can include various surface configurations including smooth, rough, textured, porous, semi-porous, dimpled, knurled, toothed, raised, grooved and/or polished. In some embodiments, relief 34 may include various configurations, for example, round, oval, hexagonal, pentagonal, octagonal, star, oblong triangular, square, rectangular, half moon, polygonal, irregular, uniform, non-uniform, offset, staggered, and/or tapered. In some embodiments, rim 26 includes one or more reliefs 34. In some embodiments, one or more reliefs 34 are spaced apart along rim 26. In some embodiments, rim 26 includes one or more reliefs 34 and does not include one or more buttons 32. In some embodiments, rim 26 includes one or more buttons 32 and does not include one or more reliefs 34. In some embodiments, rim 26 is continuous and does not include one or more buttons 32 and/or one or more reliefs 34.

Figure 8:
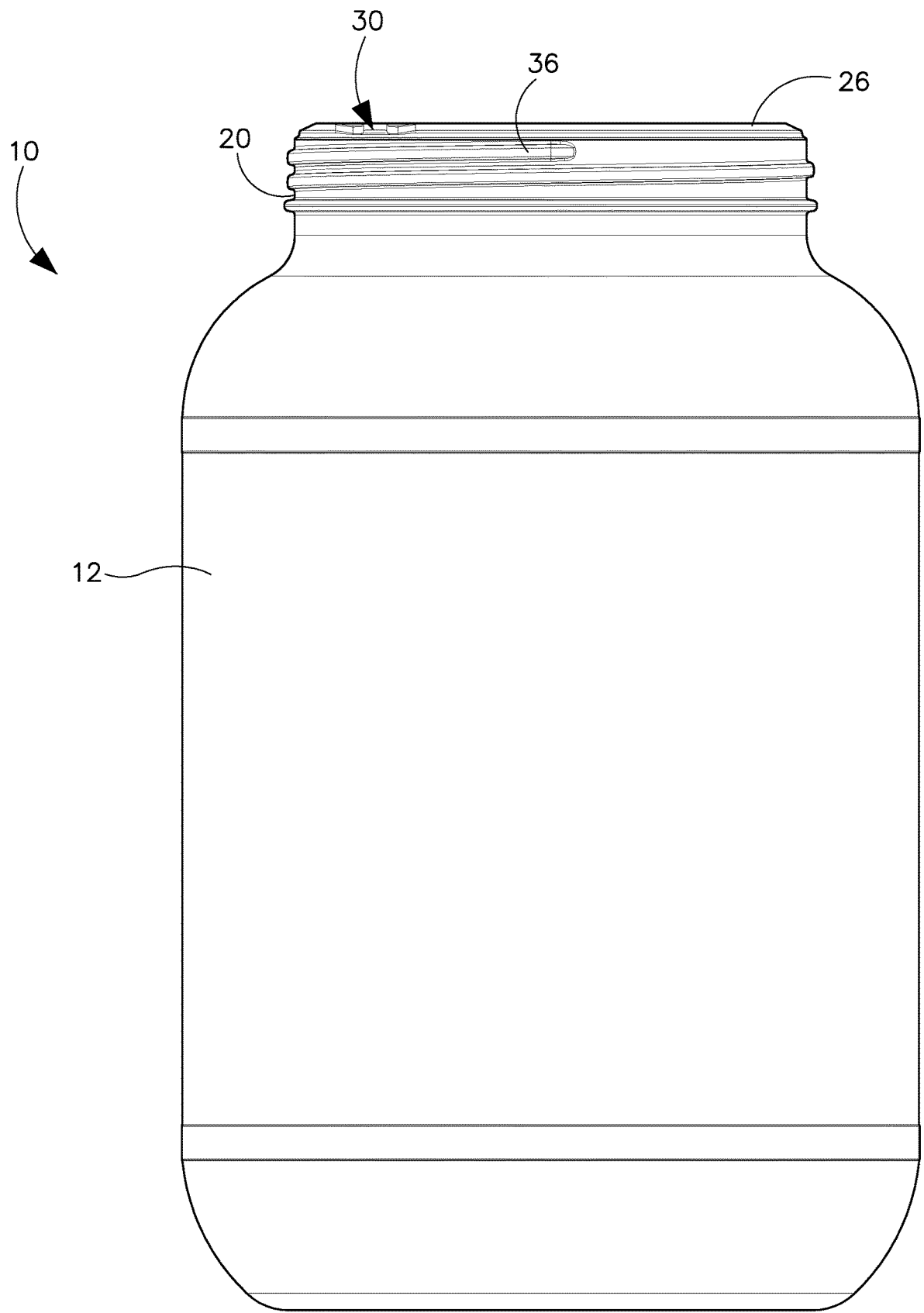
FIG. 8 is a front view of components of the container shown in FIG. 1.

As described herein, rim 26 is movable between a first configuration and a second configuration to define vent 30, as shown in FIG. 8. In the first configuration, rim 26 is oriented substantially perpendicular relative to longitudinal axis AA by +/−45 degrees, as shown in FIGS. 1 and 6. In the first configuration, rim 26 defines an initial height H1, as shown in FIG. 2. To move rim 26 from the first configuration to the second configuration, lid 40 contacts rim 26 via button 32. A selected amount of torque is applied to lid 40 such that force is applied to button 32 to move rim 26 from the first configuration to the second configuration such that rim 26 deforms to define vent 30. The selected amount of torque is in a range of 15 to 80 lb/in. Force applied to rim 26 causes rim 26 to deform, moving the height of rim 26 from height H1 to a height H2 (not shown; see for example, a similar height H4 shown in FIG. 11). Height H2 is less than height H1. Rim 26 deforms in a downward direction at button 32 and/or relief 34 to form vent 30. In some embodiments, force applied to rim 26 causes rim 26 to deform, moving a diameter of rim 26 to form vent 30.

In the second configuration, rim 26 is disposed at an angular orientation a1 relative to longitudinal axis AA in a range of 30 to 90 degrees, as shown in FIG. 3. In the second configuration, gas can enter or exit through vent 30 from inside or outside of container 10 when container 10 is sealed via lid 40. Gas that exits through vent 30 from the inside of container 10 releases into atmosphere external to container 10. In some embodiments, the gas includes a pressurized gas.

Figure 9:
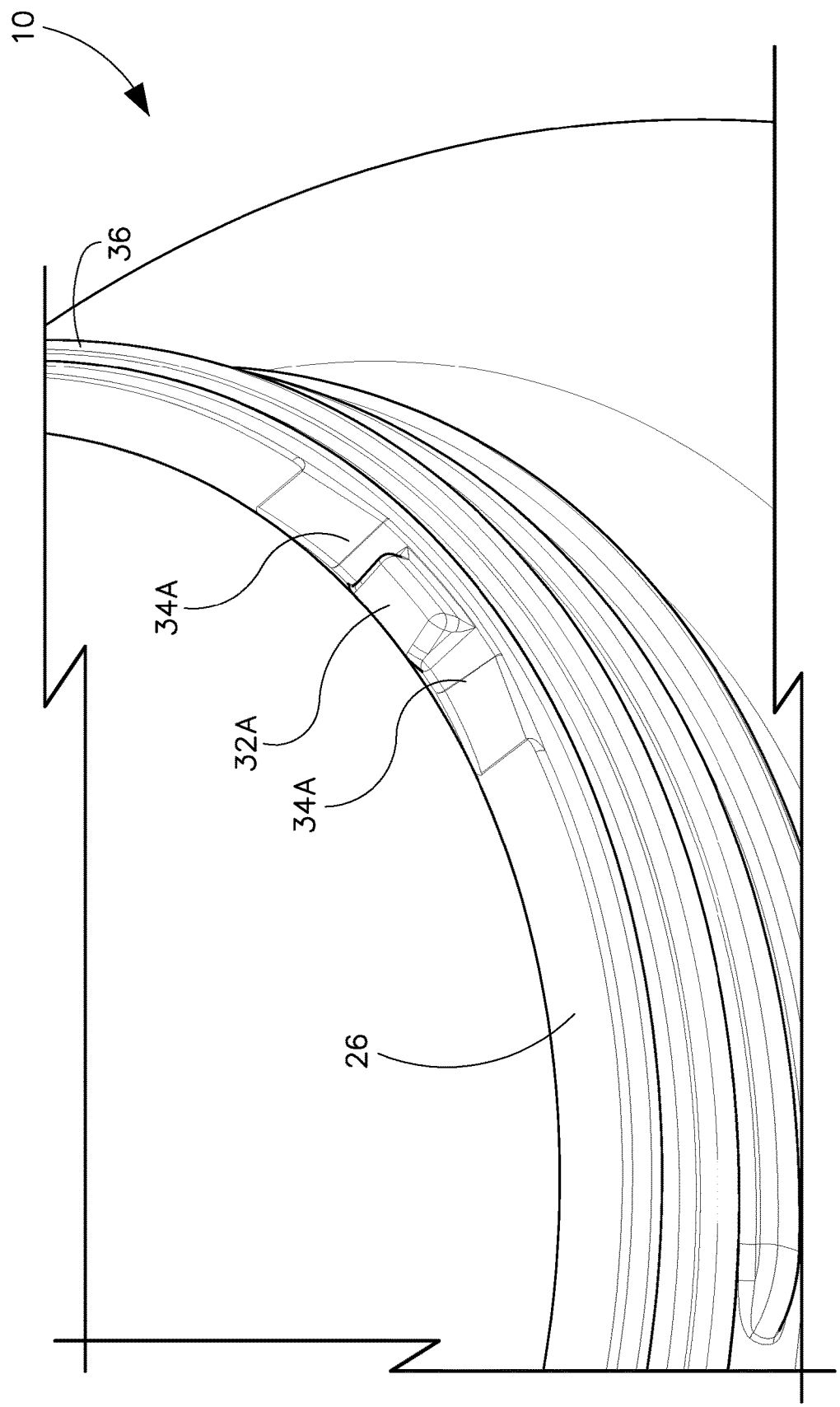
FIG. 9 is a break away perspective view of one embodiment of a container in accordance with the principles of the present disclosure.
Figure 10:
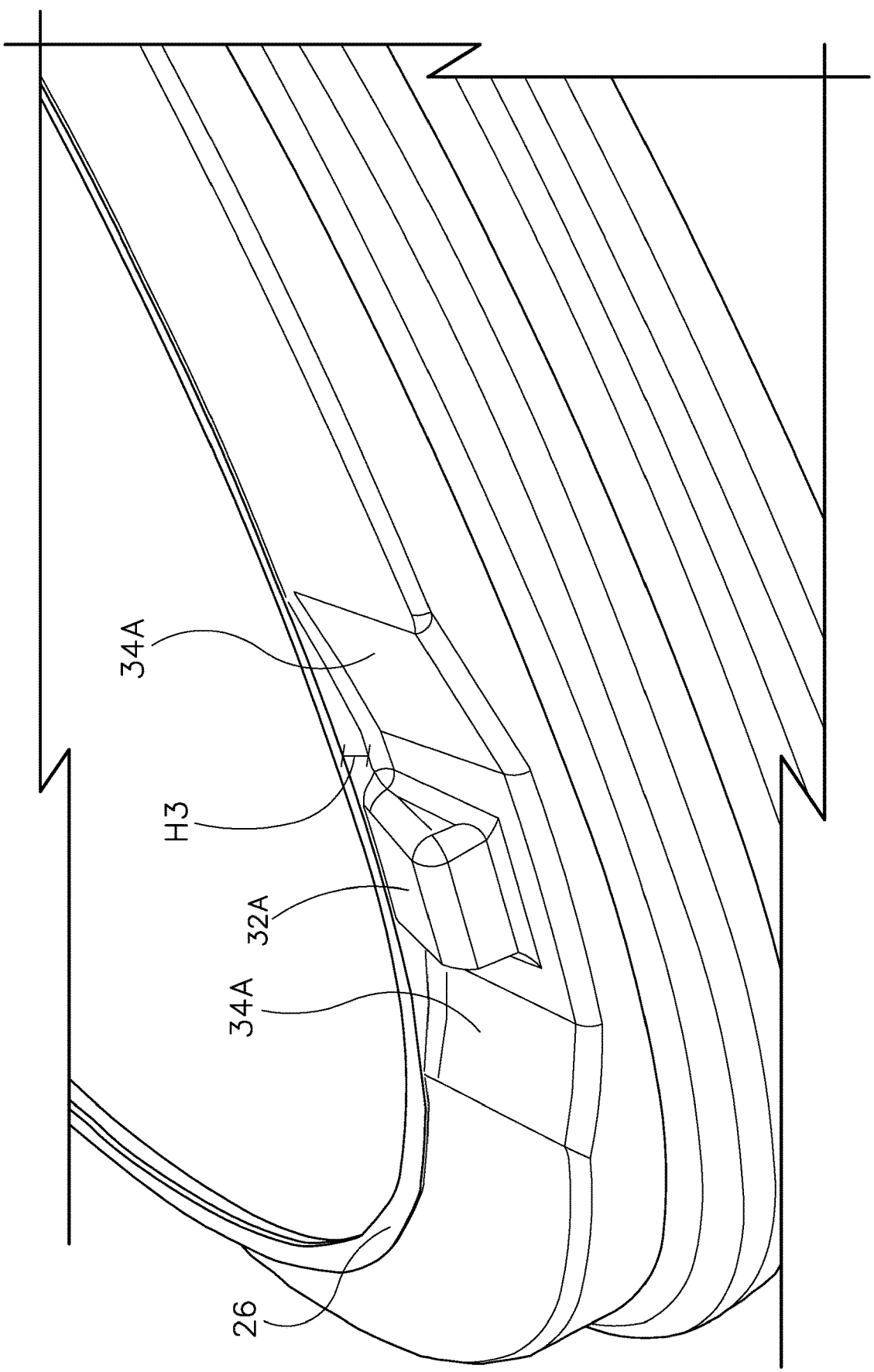
FIG. 10 is a break away perspective view of the container shown in FIG. 9.
Figure 11:
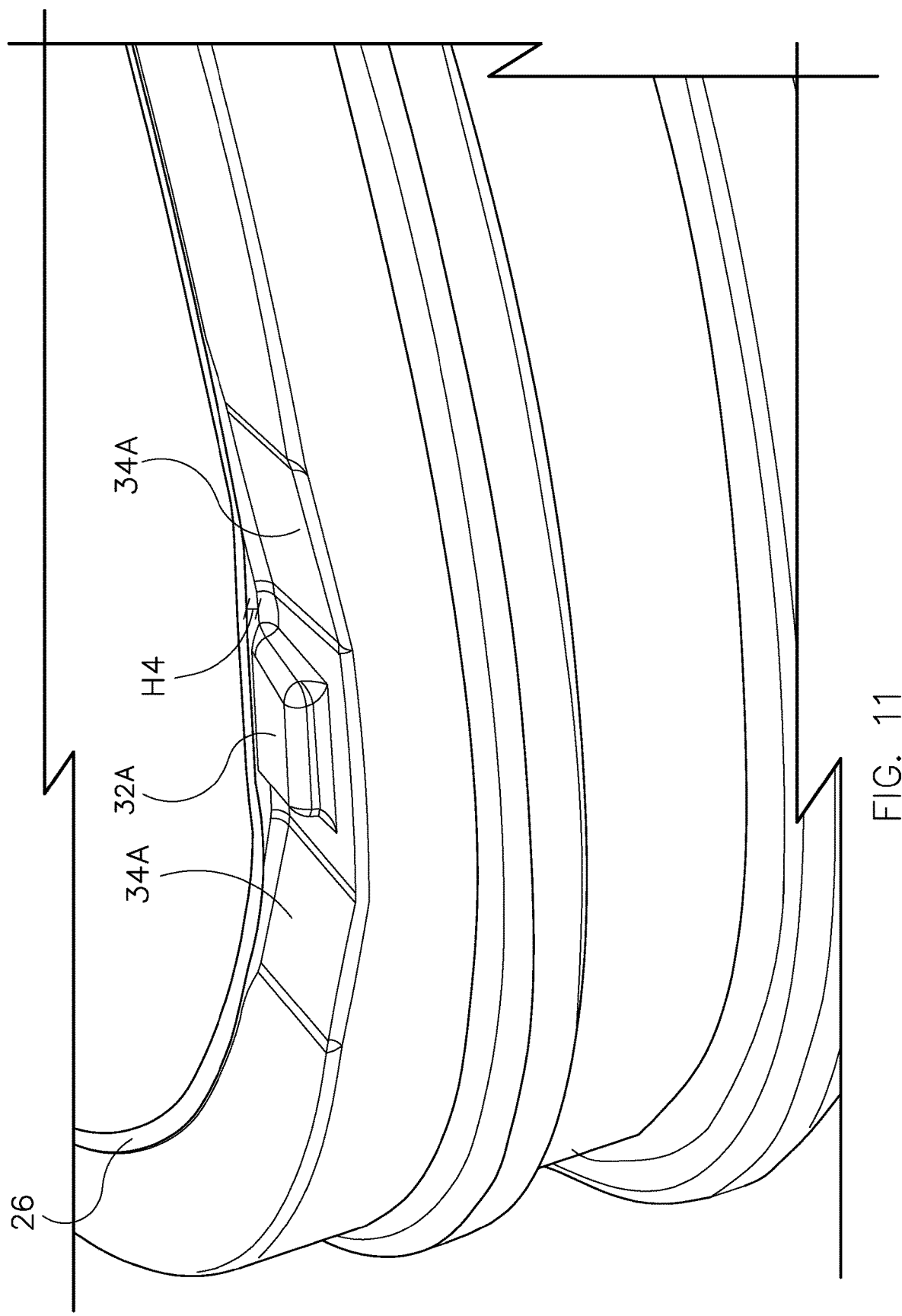
FIG. 11 is a break away perspective view of the container shown in FIG. 9.

In one embodiment, as shown in FIGS. 9-11, rim 26 includes a single projection, for example, a button 32A, similar to button 32 described above. Button 32A is rectangular shape and is disposed between a pair of tapered reliefs 34A, similar to relief 34 described above. In some embodiments, rim 26 includes one or more buttons 32A spaced apart along rim 26. As described herein, rim 26 is movable between a first configuration and a second configuration. In the first configuration, rim 26 defines an initial height H3, as shown in FIG. 10 and in the second configuration, rim 26 defines a height H4, as shown in FIG. 11. Height H4 is less than height H3.

Figure 12:
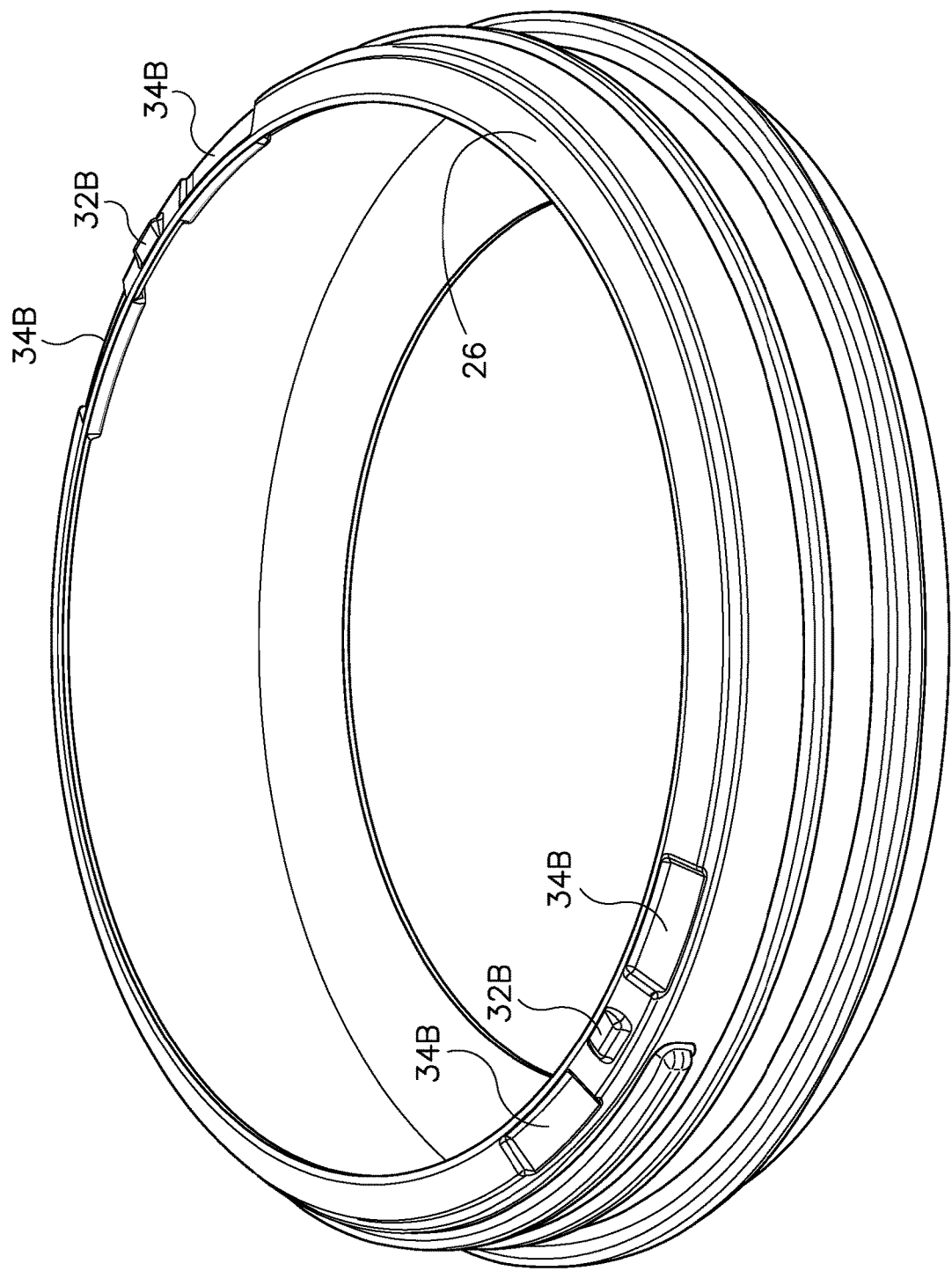
FIG. 12 is a break away perspective view of one embodiment of a container in accordance with the principles of the present disclosure.
Figure 13:
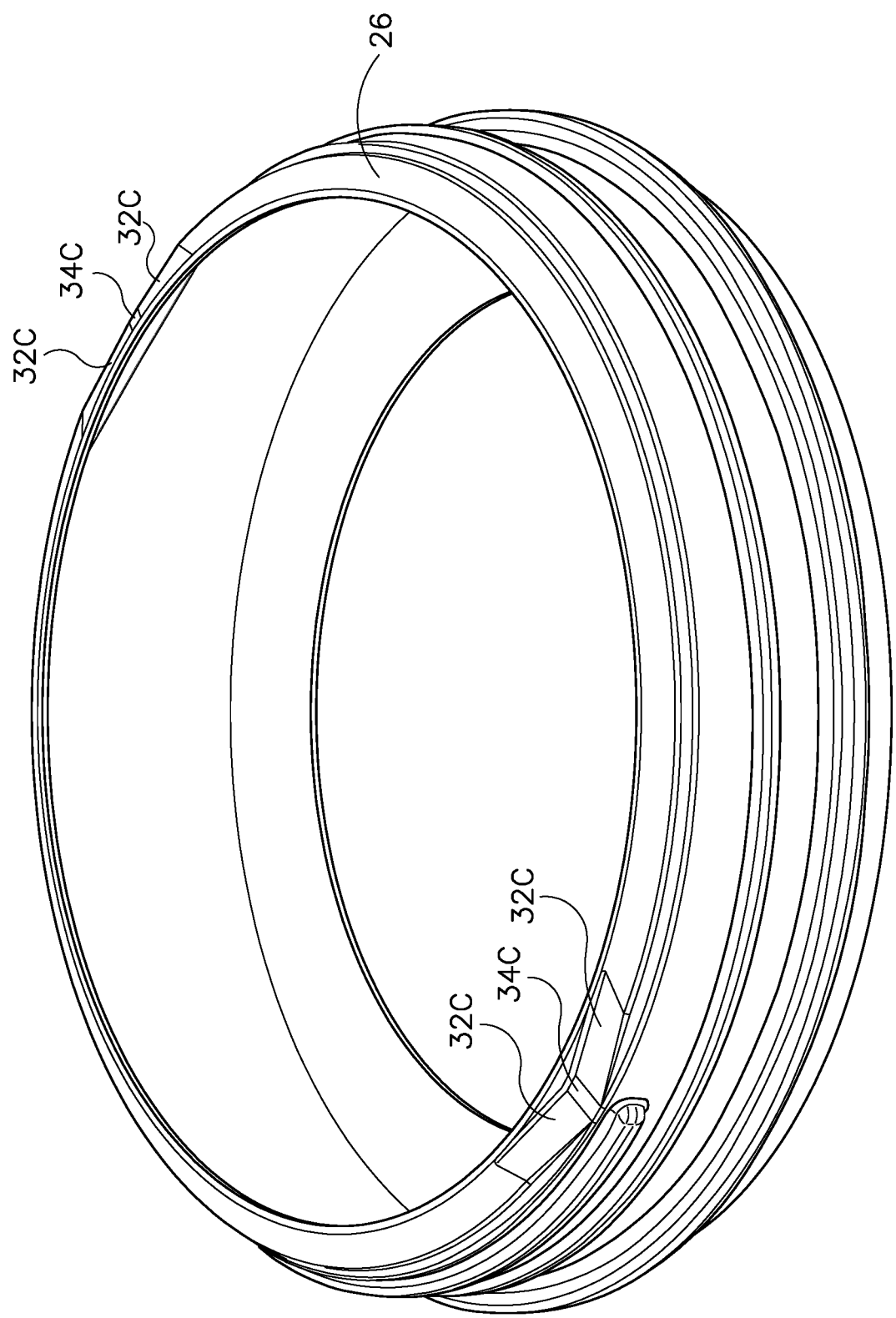
FIG. 13 is a break away perspective view of one embodiment of a container in accordance with the principles of the present disclosure.

In one embodiment, as shown in FIG. 12, rim 26 includes a single projection, for example, a button 32B, similar to button 32 described above. Button 32B is disposed on a raised surface of rim 26 and is disposed between a pair of elongated rectangular reliefs 34B, similar to relief 34 described above. Rim 26 includes a second set of button 32B and reliefs 34B disposed on an opposing side of rim 26 relative to button 32B and reliefs 34B. In one embodiment, as shown in FIG. 13, rim 26 includes a pair of projections, for example, buttons 32C, similar to button 32 described above. Buttons 32C are tapered and a relief 34C is disposed therebetween, similar to relief 34 described above. Rim 26 includes a second set of buttons 32C and relief 34C disposed on an opposing side of rim 26 relative to buttons 32C and relief 34C.

Figure 14:
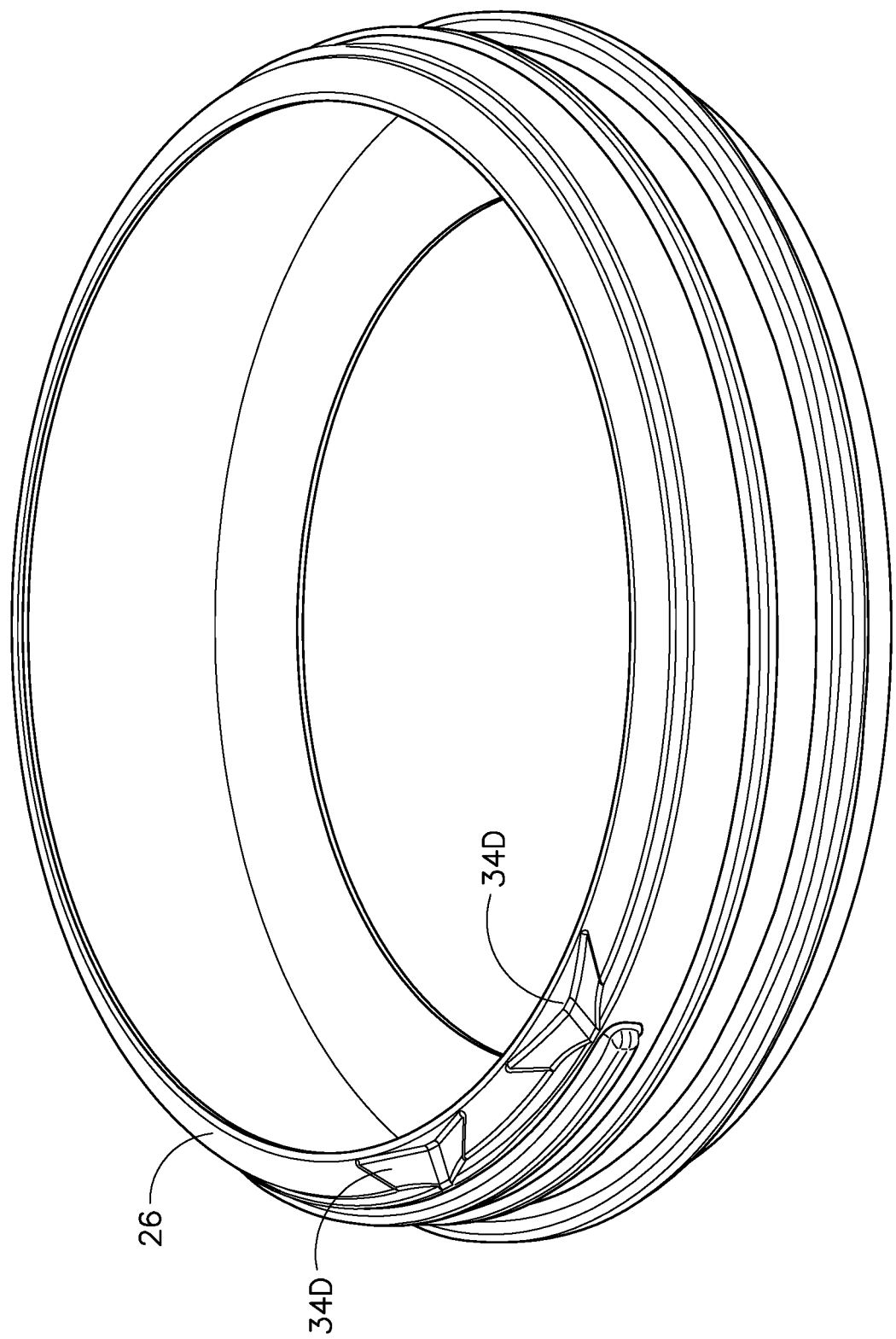
FIG. 14 is a break away perspective view of one embodiment of a container in accordance with the principles of the present disclosure.
Figure 15:
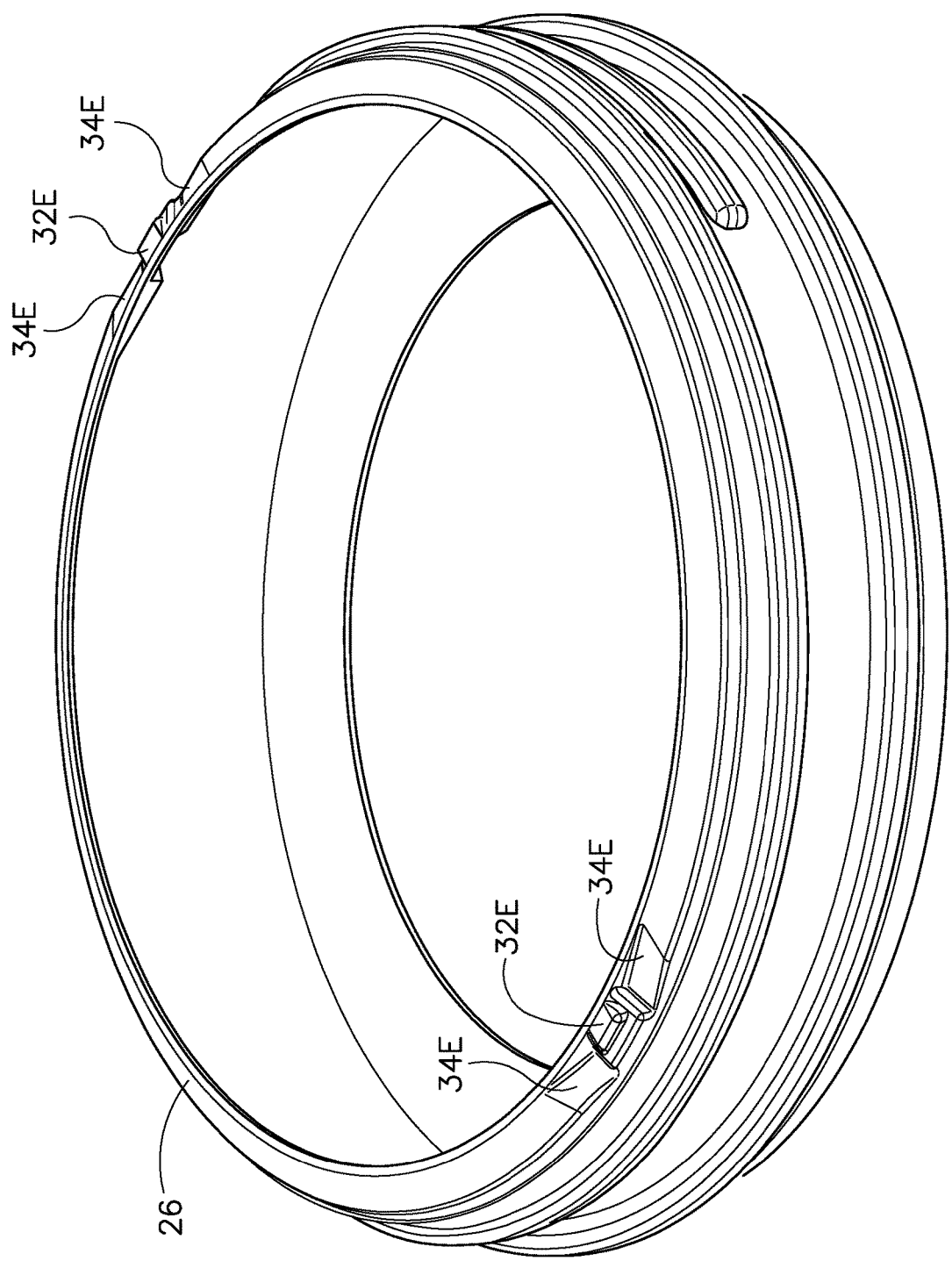
FIG. 15 is a break away perspective view of one embodiment of a container in accordance with the principles of the present disclosure.
Figure 16:
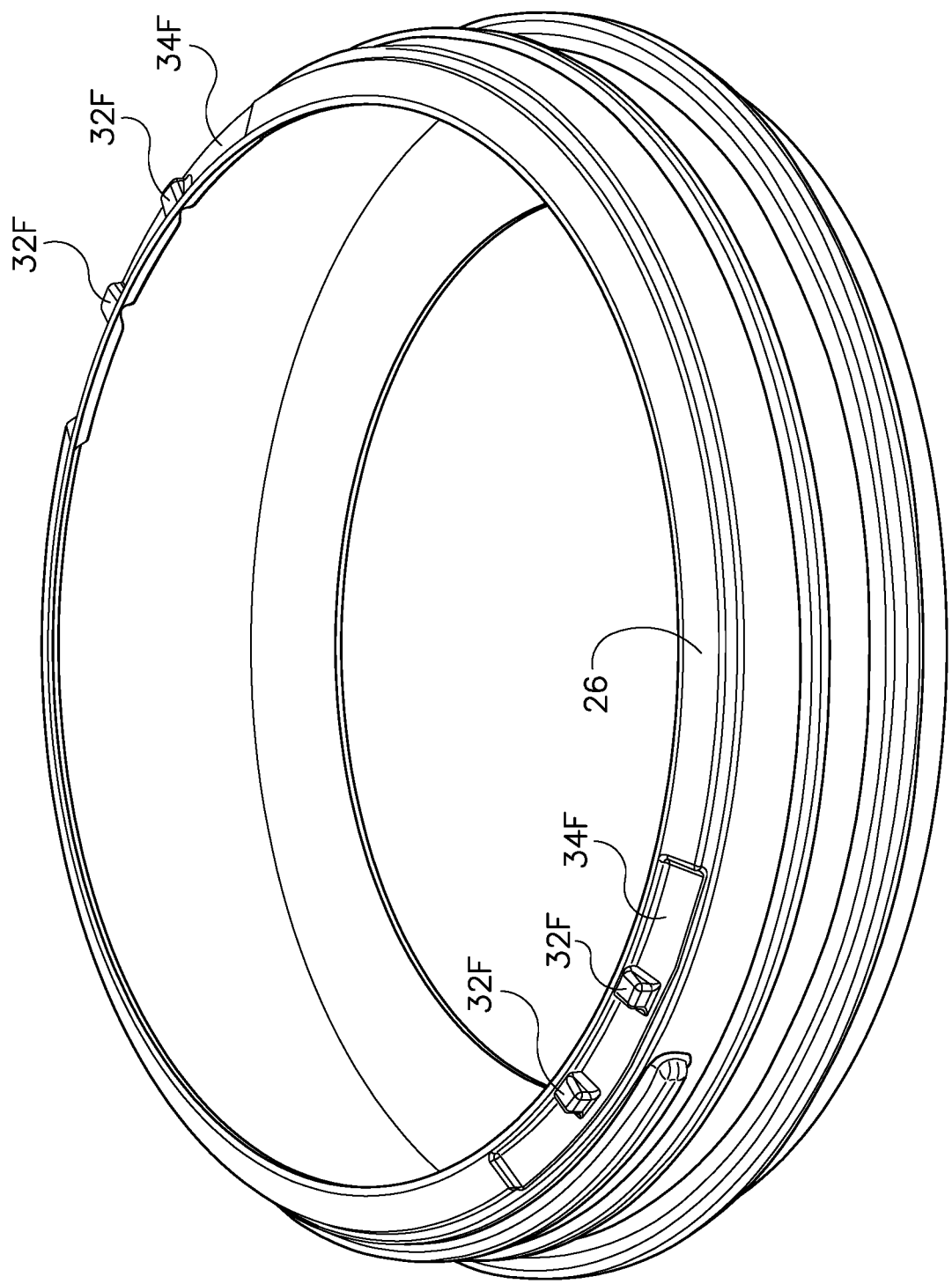
FIG. 16 is a break away perspective view of one embodiment of a container in accordance with the principles of the present disclosure.

In one embodiment, as shown in FIG. 14, rim 26 includes a pair of reliefs 34D, similar to relief 34 described above. Reliefs 34D include two converging tapered surfaces and a surface of rim 26 is disposed therebetween. In some embodiments, rim 26 includes one or more pairs of reliefs 34D spaced apart along rim 26. In one embodiment, as shown in FIG. 15, rim 26 includes a single projection, for example, a button 32E, similar to button 32 described above. Button 32E is disposed on a raised surface of rim 26 and is disposed between a pair of tapered reliefs 34E, similar to relief 34 described above. Rim 26 includes a second set of button 32E and reliefs 34E disposed on an opposing side of rim 26 relative to button 32E and reliefs 34E. In one embodiment, as shown in FIG. 16, rim 26 includes a pair of projections, for example, buttons 32F, similar to button 32 described above. Buttons 32F are square shaped and are disposed on a surface of an elongated rectangular relief 34F, similar to relief 34 described above. Rim 26 includes a second set of buttons 32F and relief 34F disposed on an opposing side of rim 26 relative to buttons 32F and relief 34F.

Figure 17:
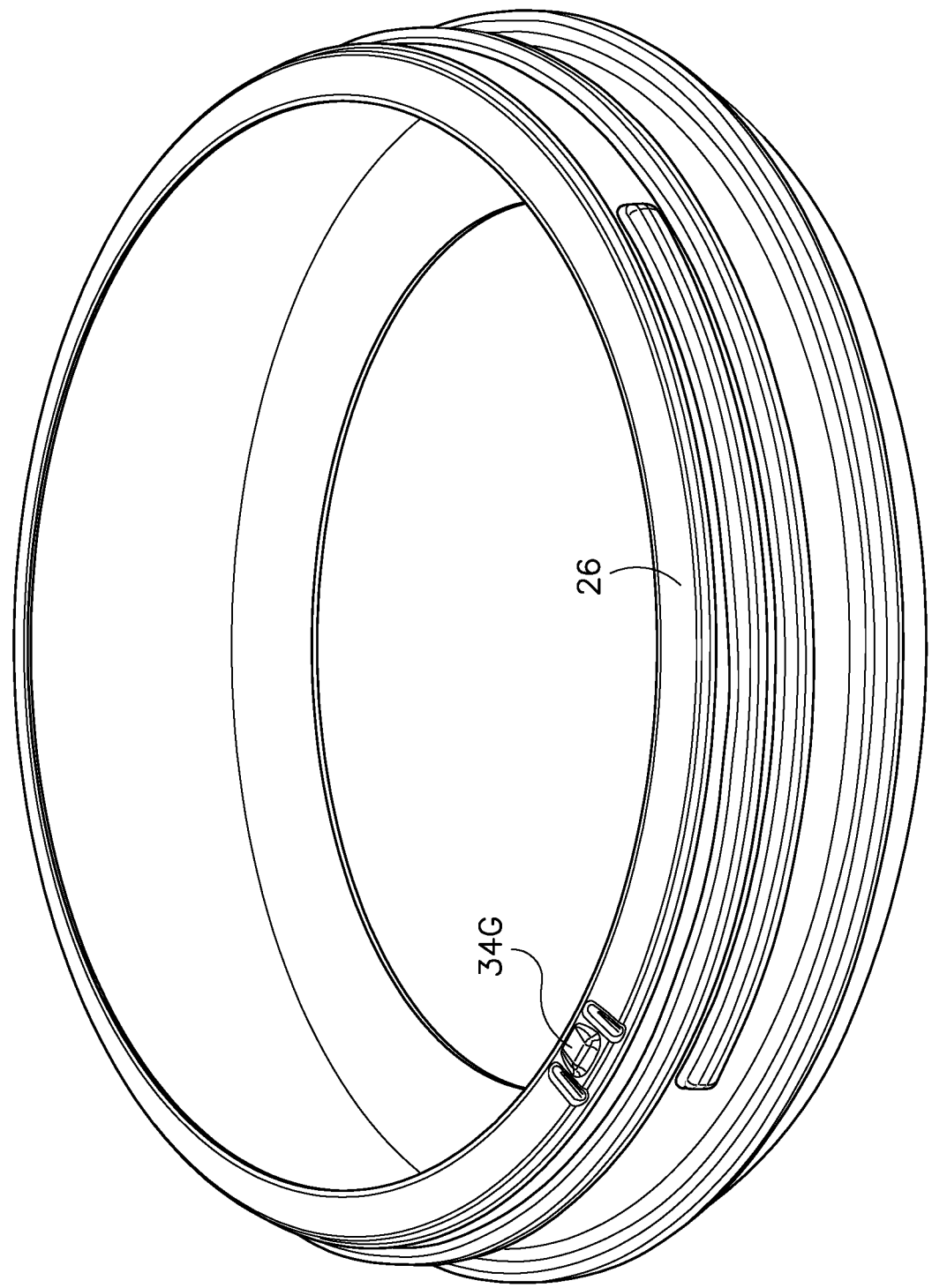
FIG. 17 is a break away perspective view of one embodiment of a container in accordance with the principles of the present disclosure.
Figure 18:
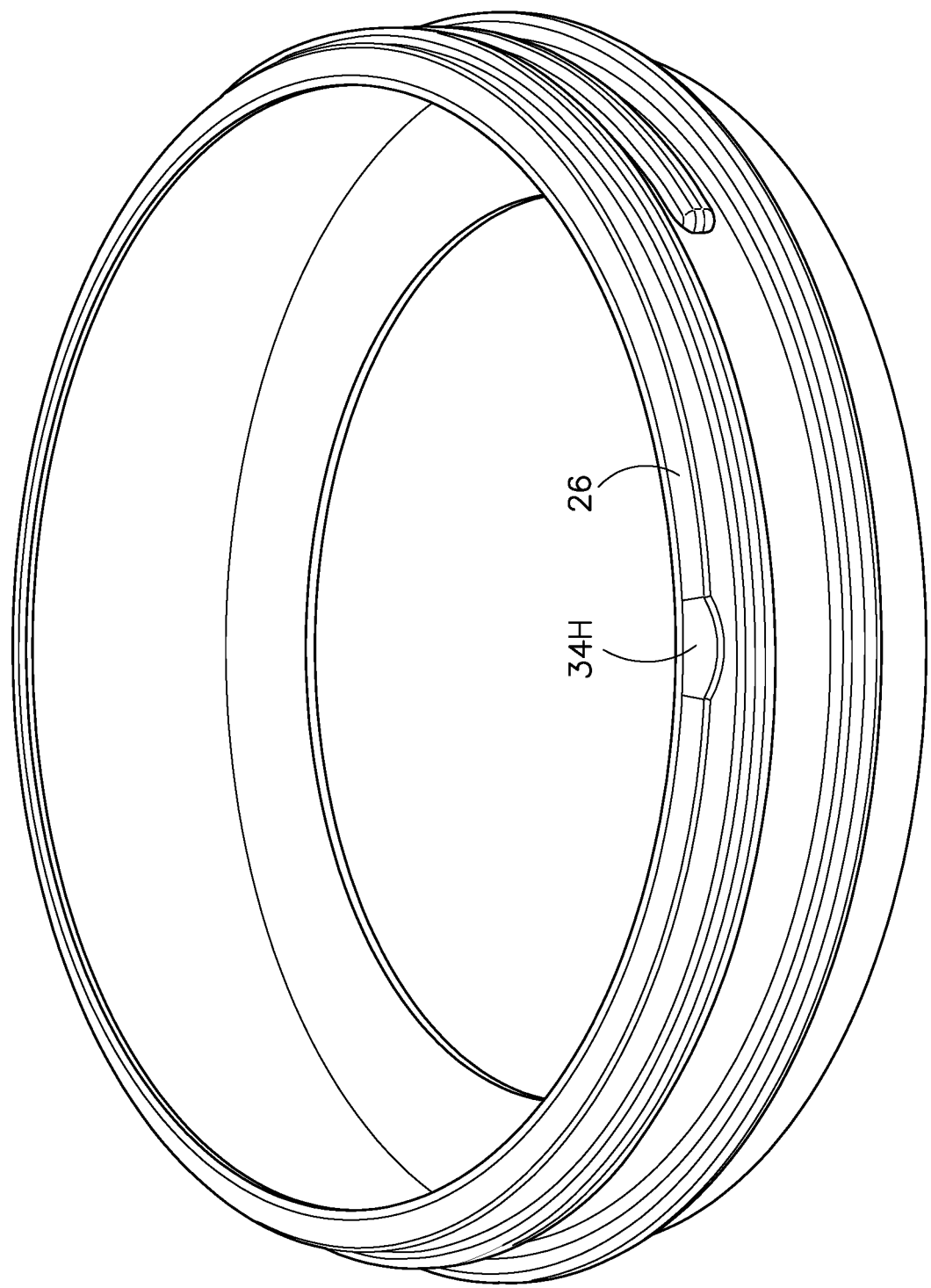
FIG. 18 is a break away perspective view of one embodiment of a container in accordance with the principles of the present disclosure.
Figure 19:
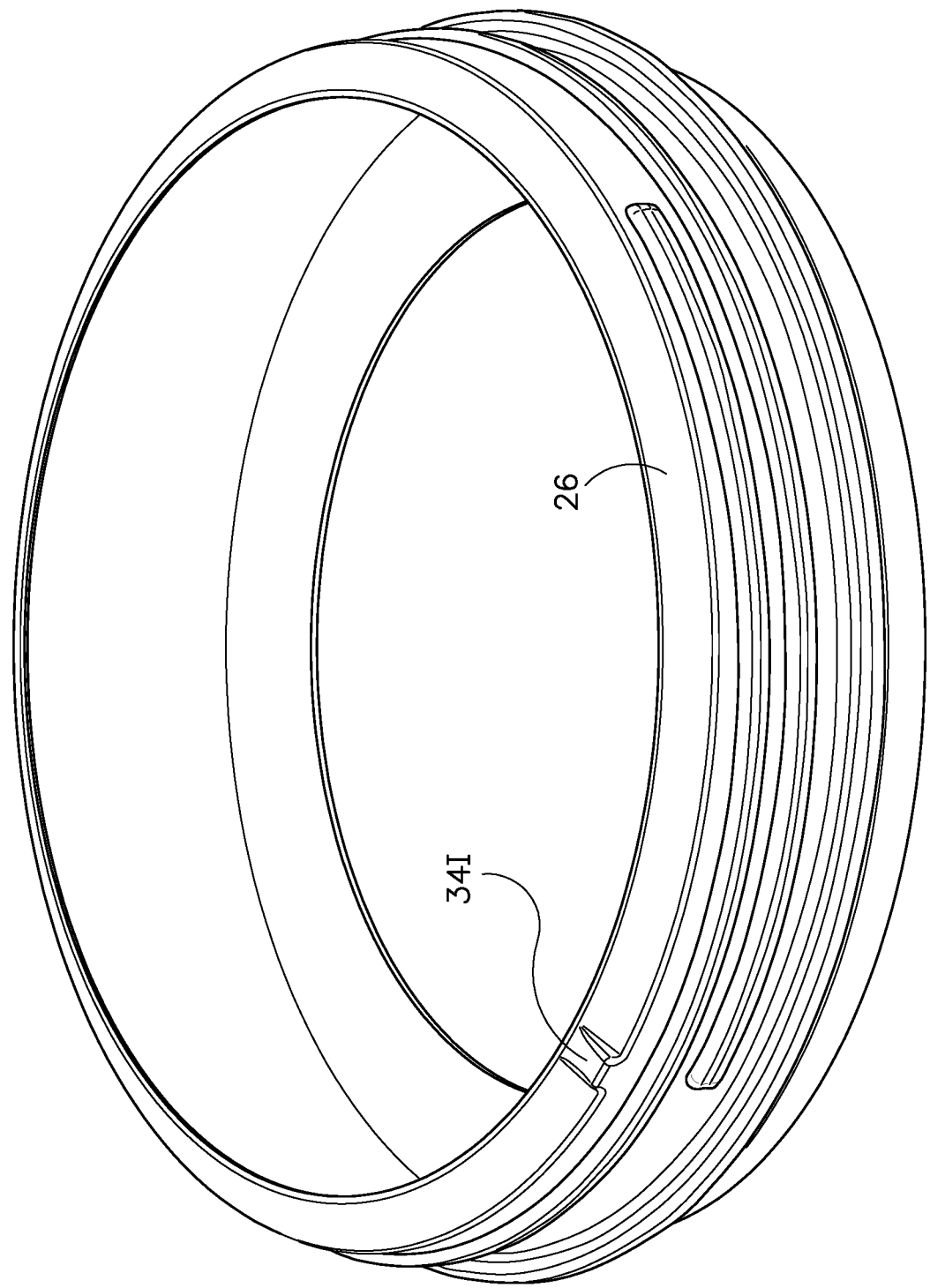
FIG. 19 is a break away perspective view of one embodiment of a container in accordance with the principles of the present disclosure.
Figure 20:
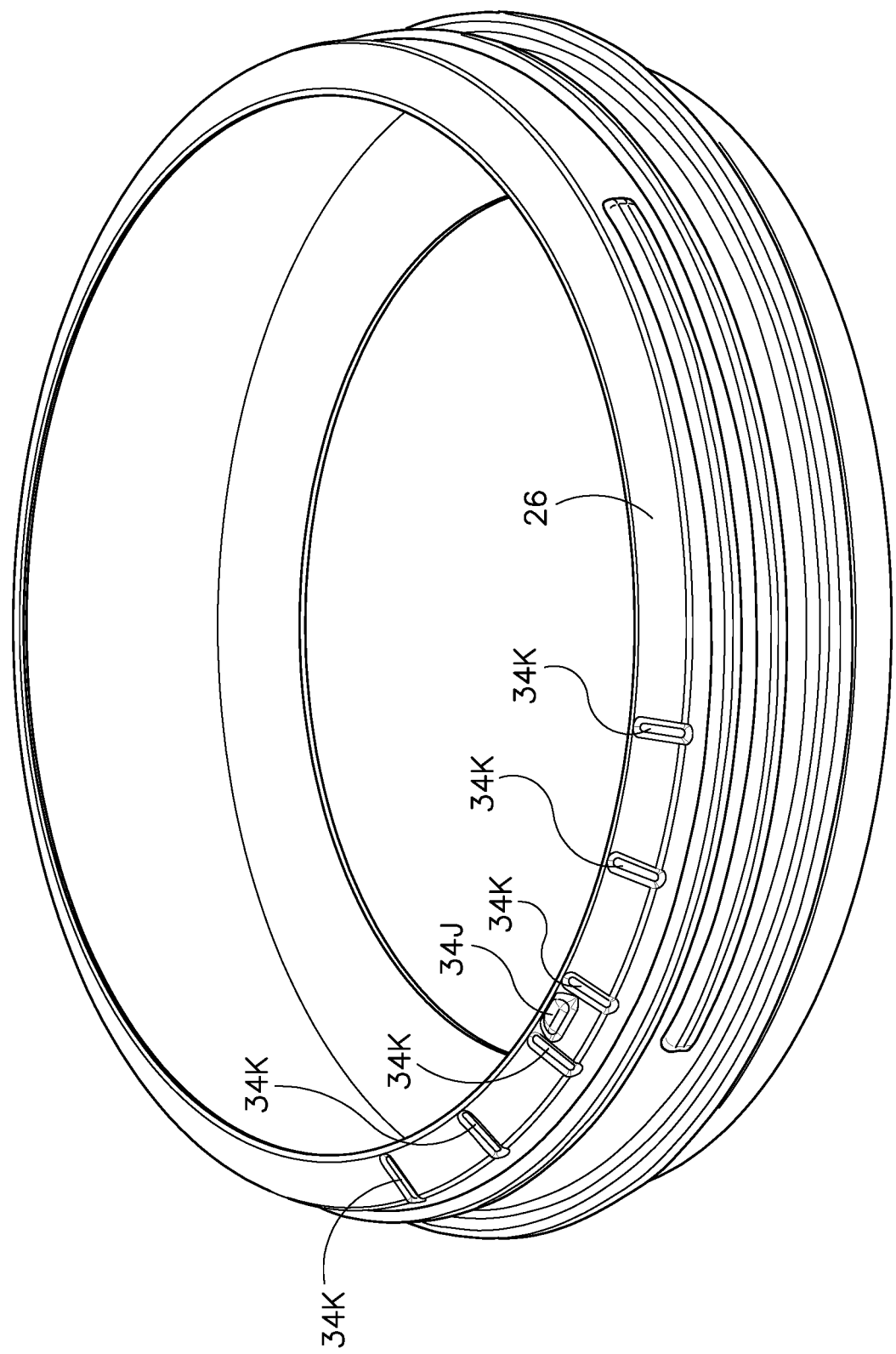
FIG. 20 is a break away perspective view of one embodiment of a container in accordance with the principles of the present disclosure.

In one embodiment, as shown in FIG. 17, rim 26 includes a relief 34G, similar to relief 34 described above. In some embodiments, rim 26 includes one or more reliefs 34G spaced apart along rim 26. In one embodiment, as shown in FIG. 18, rim 26 includes a semi-circular relief 34H, similar to relief 34 described above. In some embodiments, rim 26 includes one or more reliefs 34H spaced apart along rim 26. In one embodiment, as shown in FIG. 19, rim 26 includes a rectangular relief 34I, similar to relief 34 described above. In some embodiments, rim 26 includes one or more reliefs 34I spaced apart along rim 26. In one embodiment, as shown in FIG. 20, rim 26 includes a relief 34J disposed between a pair of reliefs 34K, similar to relief 34 described above. Rim includes six reliefs 34K. Reliefs 34K are disposed perpendicular relative to a surface of rim 26. In some embodiments, rim 26 can include more or less than six reliefs 34K and one or more reliefs 34J.

Referring to FIG. 8, vent 30 includes a wall that includes a continuous surface formed from surfaces of button 32 and surfaces of relief 34 that extends between a surface of neck 20 and rim 26. Vent 30 is continuous and non-interrupted with openings. In some embodiments, vent 30 may include one or more through openings. Vent 30 is axially aligned relative to rim 26 and body 12, as shown in FIG. 8. In some embodiments, vent 30 may be disposed at alternate orientations, relative to rim 26, for example, parallel, transverse and/or angular orientations such as acute or obtuse, coaxial and/or may be offset or staggered. In some embodiments, vent 30 includes a saw-tooth configuration to provide tamper evidence. In some embodiments, vent 30 may include various configurations, for example, round, oval, hexagonal, pentagonal, octagonal, star, oblong triangular, square, rectangular, half moon, polygonal, irregular, uniform, non-uniform, offset, staggered, and/or tapered.

In some embodiments, rim 30 includes a plurality of vents 30. In some embodiments, the plurality of vents 30 are variously dimensioned and include, but are not limited to a length from about 1 mm to about 10 mm, a height from about 1 mm to about 10 mm and/or a depth from about 1 mm to about 10 mm. In some embodiments, the plurality of vents 30 include 1 to 10 vents, 2 to 6 vents or 2 to 8 vents.

Neck finish 24 includes thread 36, as described herein that is configured for engagement with lid 40, as shown in FIG. 6. In some embodiments, thread 36 includes at least one thread. In some embodiments, thread 36 includes a plurality of threads 36. In some embodiments, thread 36 may include various configurations, for example, non-angled, irregular, uniform, non-uniform, offset, staggered, and/or tapered. In some embodiments, thread 36 is continuous or discontinuous.

In some embodiments, container 10 includes a snap bead (not shown). The snap bead is configured for engagement with lid 40. In some embodiments, the snap bead may include various configurations, for example, non-angled, irregular, uniform, non-uniform, offset, staggered, and/or tapered. In some embodiments, lid 40 is metal and/or plastic.

Container 10 is made from PET. In some embodiments, container 10 may be fabricated from plastic. In some embodiments, container 10 may be fabricated from polyester (PES), polyethylene (PE), high-density polyethylene (HDPE), polyvinyl chloride (PVC), polyvinylidene chloride (PVDC) (Saran), low-density polyethylene (LDPE), polypropylene (PP), polystyrene (PS), high impact polystyrene (HIPS), polyamides (PA) (Nylons), acrylonitrile butadiene styrene (ABS), polyethylene/acrylonitrile butadiene styrene (PE/ABS), polycarbonate (PC), polycarbonate/acrylonitrile butadiene styrene (PC/ABS), and/or polyurethanes (PU). In some embodiments, container 10, as described herein, can be fabricated from materials suitable for food packaging products. In some embodiments, such materials include synthetic polymers such as thermoplastics, semi-rigid and rigid materials, elastomers, fabric and/or their composites.

In some embodiments, container 10 has a crystallinity from about 23% to about 32%. In some embodiments, a preform of container 10 can be heated and stretched to produce a container 10 having a crystallinity between about 10 and about 50%. In some embodiments, the preform of container 10 includes a molecular weight between about 120,000 g/mol and about 500,000 g/mol.

A finished PET blow-molded, container 10 is manufactured for use with a selected application, as described herein. In some embodiments, the selected application includes food, food preparation oils, viscous and/or beverage products.

Figure 21:
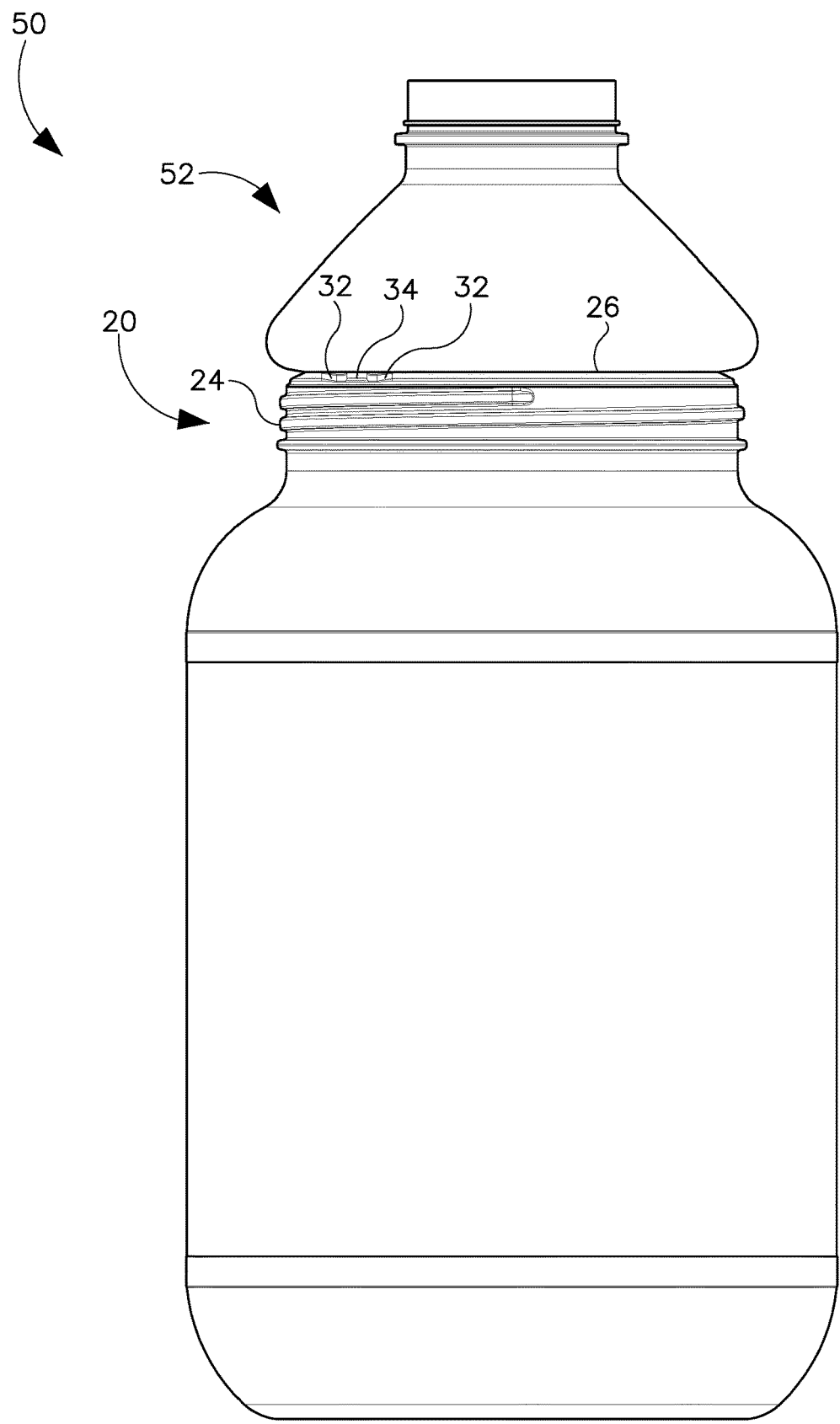
FIG. 21 is a plan view of components of one embodiment of a container in accordance with the principles of the present disclosure.

In some embodiments, a method for manufacturing container 10, as shown in FIG. 21 is provided. During manufacture, a preform mold and/or insert is blown/molded in a blow molder. The preform includes a selected configuration and is molded into an intermediate article, for example, an intermediate container 50 having neck 20, neck finish 24, rim 26, buttons 32, relief 34, and a dome 52, as shown in FIG. 19. In some embodiments, dome 52 includes a portion of buttons 32 and/or relief 34. Intermediate container 50 travels through a trimmer (not shown) where dome 52 is removed. The end product of manufacturing is the finished container 10, shown in FIGS. 1-8.

When a product is disposed in container 10, lid 40 is applied to neck 20 to form vent 30, as shown in FIG. 8, and rim 26 is movable between the first configuration and the second configuration as described herein. To move rim 26 from the first configuration to the second configuration, lid 40 contacts rim 26 via button 32. Lid 40 is rotated in a direction shown by arrow A in FIG. 6, and a selected amount of torque is applied to lid 40. A selected amount of torque is applied to lid 40 such that force is applied to button 32 to move rim 26 from the first configuration to the second configuration such that rim 26 deforms to define vent 30. Force applied to rim 26 causes rim 26 to deform in a direction, for example, a direction relative to end 16, as shown by arrow B in FIG. 6 to move the height of rim 26 from height H1, as shown in FIG. 2, to height H2 (not shown; see for example, a similar height H4 shown in FIG. 11). Rim 26 deforms at the location of button 32 and/or relief 34 to form vent 30. In some embodiments, vent 30 is a safety feature and enables container 10 to vent gas from an interior of container 10 and into the atmosphere prior to lid 40 removal. In some embodiments, vent 30 facilitates the venting of humid or moist air from the interior of container 10 and into the atmosphere when container 10 is filled with a hot product during manufacture.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:
1. A blow molded container comprising:
a neck including a neck finish and a transverse rim, the rim including an outer surface and an opposite inner surface that defines an opening, the container comprising a pair of projections each extending from the outer surface, the rim comprising a relief between the projections, the relief extending into the outer surface; and
a closure being engageable with the neck to cover the opening such that rotation of the closure relative to the neck deforms the neck and the relief defines a vent configured for passage of a gas.

2. A blow molded container as recited in claim 1, wherein the rim is movable between a first configuration in which the relief does not define the vent, and a second configuration in which the relief defines the vent.

3. A blow molded container as recited in claim 2, wherein in the first configuration, the rim is oriented substantially perpendicular relative to a longitudinal axis of the container.

4. A blow molded container as recited in claim 2, wherein in the first configuration, the the projections have a first height along a longitudinal axis of the container and in the second configuration, the projections have a second height along the longitudinal axis, the second height being less than the first height.

5. A blow molded container as recited in claim 1, wherein a selected amount of torque is applied to the closure to rotate the closure relative to the neck.

6. A blow molded container as recited in claim 5, wherein the selected amount of torque is in a range of 15 to 80 lb/in.

7. A blow molded container as recited in claim 1, wherein:
the rim is movable between a first configuration in which the relief does not define the vent, and a second configuration in which the relief defines the vent, and
in the second configuration, the rim is disposed at an acute angle relative to a longitudinal axis of the container.

8. A blow molded container as recited in claim 1, further comprising a body defining a longitudinal axis and the rim is disposed at a transverse angle relative to the longitudinal axis.

9. A blow molded container as recited in claim 1, wherein the projections are configured for engagement with the closure to move the rim from a first configuration in which the relief does not define the vent, to a second configuration in which the relief defines the vent.

10. A blow molded container as recited in claim 1, wherein the projections each include a button.

11. A blow molded container as recited in claim 1, wherein:
the rim is movable between a first configuration, in which the relief does not define the vent, and a second configuration, in which the relief defines the vent,
in the first configuration, the rim is oriented perpendicular relative to a longitudinal axis of the container, and
in the second configuration, the rim is oriented at an acute angle relative to the longitudinal axis.

12. A blow molded container as recited in claim 1, wherein the projections are tapered.

13. A blow molded container as recited in claim 1, wherein the neck finish comprises a thread, the projections being spaced apart from the thread.

14. A blow molded container as recited in claim 1, wherein the projections are molded into the rim of the container.

15. A blow molded container as recited in claim 1, wherein the rim includes one or more reliefs projections are first and second projections and the relief is a first relief, the container comprising third and fourth projections each extending from the outer surface, the rim comprising a second relief between the third and fourth projections, the second relief extending into the outer surface.

16. A blow molded container as recited in claim 1, wherein rim the neck finish includes a thread extending from an outer surface of the neck, the projections being spaced apart from the thread, the outer surface of the neck being flush with the outer surface of the rim.

17. A blow molded container comprising:
a neck including a neck finish and a transverse rim, the rim including an outer surface and an opposite inner surface that defines an opening, the container including a pair of external projections each extending from the outer surface, the projections defining a relief therebetween, the relief extending into the outer surface;
a body defining a longitudinal axis; and
a monolithic closure covering the opening, the closure being engageable with the projections such that rotation of the closure relative to the neck deforms the neck to move the rim relative to the neck between a first configuration in which the relief does not define a vent configured for passage of a gas, and a second configuration in which the relief defines a vent configured for passage of a gas.

18. A blown molded container as recited in claim 17, wherein a selected amount of torque is applied to the closure such that force is applied to the rim to move the rim from the first configuration to the second configuration.

19. A blow molded container consisting of:
a neck including a neck finish and a transverse rim, the rim including an outer surface and an opposite inner surface that defines an opening, the container comprising a pair of projections each extending from the outer surface, the rim comprising a relief between the projections, the relief extending into the outer surface; and
a monolithic closure being engageable with the projections such that rotation of the closure relative to the neck deforms the neck to move the rim relative to the neck between a first configuration in which the relief does not define a vent configured for passage of a gas, and a second configuration, in which the relief defines a vent configured for passage of a gas.

20. A blow molded container as recited in claim 19, wherein the neck finish includes a thread extending from an outer surface of the neck, the projections being spaced apart from the thread, the outer surface of the neck being flush with the outer surface of the rim.

* * * * *